(12) United States Patent
Cross (10) Patent No.: US 10,981,643 B2
(45) Date of Patent: Apr. 20, 2021

(54) CONTROLLING AERODYNAMIC SPANLOAD CONTROL DEVICES

(71) Applicant: Airbus Operations Limited, Bristol (GB)

(72) Inventor: Murray Cross, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 478 days.

(21) Appl. No.: 16/002,485

(22) Filed: Jun. 7, 2018

(65) Prior Publication Data

US 2018/0354605 A1   Dec. 13, 2018

(30) Foreign Application Priority Data

Jun. 8, 2017 (GB) ..................................... 1709131

(51) Int. Cl.
| | |
|---|---|
| *B64C 3/52* | (2006.01) |
| *B64D 45/00* | (2006.01) |
| *B64C 13/30* | (2006.01) |
| *B64C 23/06* | (2006.01) |

(52) U.S. Cl.
CPC ................ *B64C 3/52* (2013.01); *B64C 13/30* (2013.01); *B64C 23/072* (2017.05); *B64D 45/0005* (2013.01); *B64D 2045/0085* (2013.01)

(58) Field of Classification Search
CPC ......... B64C 3/52; B64C 23/072; B64C 13/30; B64D 45/0005; B64D 2045/0085
See application file for complete search history.

(56) References Cited

U.S. PATENT DOCUMENTS

| | | | | |
|---|---|---|---|---|
| 4,722,499 | A * | 2/1988 | Klug ..................... | B64C 23/076 244/199.4 |
| 6,345,790 | B1 * | 2/2002 | Brix ...................... | B64C 23/076 244/199.4 |
| 10,189,557 | B2 * | 1/2019 | Boye ........................ | B64C 3/56 |
| 2004/0000619 | A1 | 1/2004 | Barriety | |
| 2005/0133672 | A1 * | 6/2005 | Irving ................... | B64C 23/072 244/201 |
| 2006/0049307 | A1 * | 3/2006 | Schweiger ............... | B64C 9/10 244/75.1 |
| 2017/0113780 | A1 * | 4/2017 | Boye ..................... | B64C 23/072 |

FOREIGN PATENT DOCUMENTS

| | | |
|---|---|---|
| EP | 1 531 126 | 5/2005 |
| GB | 2533413 | 6/2016 |

OTHER PUBLICATIONS

Combined Search and Examination Report for GB1709131.5, dated Nov. 24, 2017, 7 pages.

* cited by examiner

*Primary Examiner* — Justin M Benedik
(74) *Attorney, Agent, or Firm* — Nixon & Vanderhye P.C.

(57) ABSTRACT

An aerodynamic structure is disclosed having a lifting surface, a control device and an actuation mechanism. The lifting surface has a root and a tip, and is deformable during operation of the aerodynamic structure. The control device is movably attached to the lifting surface, at or near the tip. The actuation mechanism is for controlling movement of the control device, and is configured to transmit deformation movement of the lifting surface to the control device.

18 Claims, 4 Drawing Sheets

CONTROLLING AERODYNAMIC SPANLOAD CONTROL DEVICES

CROSS RELATED APPLICATION

This application claims priority to United Kingdom (GB) patent application 1709131.5, filed Jun. 8, 2017, the entire contents of which is hereby incorporated by reference.

TECHNICAL FIELD

The present invention relates to an aerodynamic structure, and in particular to an aerodynamic structure comprising a lifting surface, a movable control device, and an actuation mechanism for controlling movement of the control device.

BACKGROUND

In the design of lifting surfaces, e.g. wings of fixed wing aircraft, blades of rotary wing aircraft, blades of wind turbines, etc., a design point is generally chosen corresponding to a particular theoretical operating condition. The design point is often chosen as a mid-point of the operating regime. The shape of the lifting surface as manufactured is selected such that at the design point the lifting surface will deform to meet the anticipated shape at the design point.

One consequence of this design process is that at operating conditions other than the design point the shape of the lifting surface is likely to be aerodynamically sub-optimal. Moreover, even the theoretical operating condition corresponding to the design point may not be realised in practice.

Lifting surfaces are inherently flexible structures and a significant factor affecting the aerodynamic performance of the lifting surface is the tendency to twist and bend under aerodynamic loading. Local twist (local angle of attack) changes the local aerodynamic loading distribution, and this impacts the overall lifting surface lift, drag and moment characteristics. As an example, the lift induced drag of a lifting surface is dependent upon the spanwise lift distribution, which changes as the lifting surface twists and bends under load. In addition the necessary strength (and weight) of a lifting surface structure is dependent on the spanwise lift distribution—a lifting surface with a lift distribution more biased towards the wing tip will typically be heavier than one with a lift distribution more biased towards the lifting surface root, due to higher bending moments.

The flexural axis is defined as the line of shear centres of the aerofoil sections in the spanwise direction of the lifting surface, where the shear centre is the point in the section where a shear load causes no twist and a torque causes no bending.

Many fixed and rotary wings have one or more control devices (e.g. flaps, spoilers, wing tip devices, or the like) attached at or near the outboard end of the wing. These control devices are typically designed to reduce lift induced drag. Control devices may be fixed to the wing so as to be non-movable, or may be movable to enable active control of the aerodynamic characteristics of the wing.

SUMMARY

A first aspect of the present invention provides an aerodynamic structure. The aerodynamic structure comprises a lifting surface, a control device and an actuation mechanism. The lifting surface has a root and a control, and is deformable during operation of the aerodynamic structure. The control device is movably attached to the lifting surface at or near the tip of the lifting surface. The actuation mechanism is for controlling movement of the control device, and is configured to transmit deformation movement of the lifting surface to the control device.

Optionally, the lifting surface is deformable by twisting about a flexural axis extending in the spanwise direction of the lifting surface. In such cases a value of torque or force effective at the lifting surface about the flexural axis may be variable in dependence on the relative positions of the control device and the lifting surface.

Optionally, the lifting surface is deformable between a first deformed state, an undeformed state, and a second deformed state, and the actuation mechanism is configured such that the control device is in a first deployed position when the lifting surface is in the first deformed state, is in a non-deployed position when the lifting surface is in the undeformed state, and is in a second deployed position when the lifting surface is in the second deformed state. Optionally, in the first deformed state the lifting surface is twisted about the flexural axis in a first direction, and in the second deformed state the lifting surface is twisted about the flexural axis in a second, opposite, direction. Optionally, the control device is configured such that in the first deployed position it generates torque and/or force effective at the lifting surface about the flexural axis in the second direction, and in the second deployed position it generates torque and/or force effective at the lifting surface about the flexural axis in the first direction.

Optionally, the actuation mechanism comprises a connecting component having a first end attached to an attachment location on the lifting surface and a second end connected to the control device. Optionally the connecting component has a fixed length, and the attachment location is located such that a distance between the attachment location and the control device is variable in dependence on a deformation state of the lifting surface. Optionally, the attachment location is one or more of: at or near a leading edge of the lifting surface; at or near a trailing edge of the lifting surface; at or near a mid-chord location of the lifting surface; at or near the root; at or near an external skin of the lifting surface.

Optionally, the connecting component comprises a flexible wire.

Optionally, the actuation mechanism comprises a first connecting component having a first end attached to a first attachment location on the lifting surface and a second end connected to the control device; and a second connecting component having a first end attached to a second attachment location on the lifting surface and a second end connected to the control device.

Optionally, the first attachment location is located such that a distance x between the first attachment location and the control device varies with the deformation state of the lifting surface according to a first predefined relationship and the second attachment location is located such that a distance y between the second attachment location and the control device varies with the deformation state of the lifting surface according to a second predefined relationship. Optionally, the first predefined relationship is defined based on a first route through the aerodynamic structure followed by the first connecting component and the second predefined relationship is defined based on a second route through the aerodynamic structure followed by the second connecting component.

Optionally, the first attachment location is at or near an upper external skin of the lifting surface and the second attachment location is at or near a lower external skin of the lifting surface.

Optionally, the actuation mechanism comprises a control wheel rotatably mounted to the lifting surface and connected to the control device such that rotation of the control wheel causes movement of the control device, and wherein the connection of the or each connecting component to the control device comprises attachment of the second end of the or each connecting component to the control wheel. Optionally, the control device is configured to rotate about an axis which is at an angle to the axis of rotation of the control wheel, and wherein the control wheel is connected to the control device by a transmission mechanism configured to convert rotation about the axis of rotation of the control wheel into rotation about the axis of rotation of the control device.

Optionally, the aerodynamic structure further comprises an additional control device movably attached to the lifting surface at or near the tip. Optionally, the actuation mechanism is additionally for controlling movement of the additional control device, and is configured to transmit deformation movement of the lifting surface to the control device and to the additional control device. Optionally, the aerodynamic structure further comprises an additional actuation mechanism for controlling movement of the additional control device independently to movement of the control device.

Optionally, the aerodynamic structure further comprises at least one sensor to detect a deformation state of the lifting surface. Optionally, the aerodynamic structure further comprises a locking mechanism to prevent movement of the control device. Optionally, the locking mechanism is configured to activate in response to a detection by the at least one sensor of a deformation state meeting a predefined locking criterion, and/or in response to failure of one or more components of the actuation mechanism. Optionally, the at least one sensor is communicatively coupled to an avionics system of an aircraft on which the aerodynamic structure is installed, and wherein the at least one sensor is configured to send data indicating a deformation state of the lifting surface to the avionics system.

Optionally, the control device is a tip device, and is attached to the tip of the lifting surface.

A second aspect of the present invention provides an aircraft comprising an aerodynamic structure according to the first aspect.

A third aspect of the present invention provides a wing for an aircraft. The wing has a main part and a control part movable relative to the main part. At least the main part is configured to deform during operation of the aircraft, and the position of the control part is controlled in dependence on the deformation of the main part by an actuation mechanism configured to cause movement of the control part by transmitting motion of a location on the main part to the control part.

BRIEF DESCRIPTION OF THE DRAWINGS

Embodiments of the invention will now be described, by way of example only, with reference to the accompanying drawings, in which.

DETAILED DESCRIPTION

The examples described below relate to aerodynamic structures for aircraft. As used herein, the term "aerodynamic structure" is intended to refer to any structure having a surface which is exposed to airflow during flight, such that the nature of the structure (and in particular the surface) will affect the aerodynamic performance of an aircraft in which the structure is comprised.

Each example aerodynamic structure described below comprises a lifting surface having a root and a tip, a control device movably attached to the lifting surface at or near the tip, and an actuation mechanism for controlling movement of the control device. In each example, the lifting surface is deformable during operation of the aerodynamic structure, and the actuation mechanism is configured to transmit deformation movement of the lifting surface to the control device.

In some (but not necessarily all) examples, the actuation mechanism is entirely mechanical (that is, it does not include any electronic components or rely on electrical power for any part of its operation). For aircraft applications, an entirely mechanical (or passive) actuation mechanism is advantageous because it may be more robust and reliable than an electronic system, and may be easier to get certified for aviation use. The examples described herein advantageously provide a passive actuation mechanism for a control device by transmitting (directly or indirectly) movement of a lifting surface which is caused by deformation of that lifting surface to the control device, for example by means of a mechanical connection between a location on the lifting surface and the control device.

Figure 1:
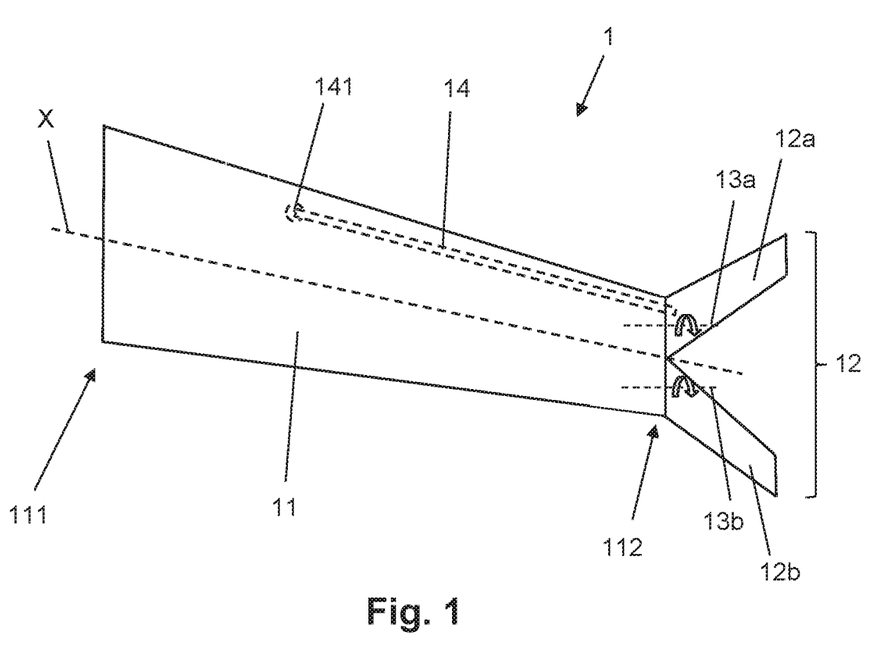
FIG. 1 is a plan view of an example aerodynamic structure according to the invention.

FIG. 1 shows an example aerodynamic structure 1. The aerodynamic structure 1 comprises a lifting surface 11, a control device 12, which is movably attached to the lifting surface 11, and an actuation mechanism 14 for controlling movement of the control device 12. The aerodynamic structure 1 may be any structure comprised of a lifting surface and a control device. For example, the aerodynamic structure may be a wing, or a part of a wing. If the aerodynamic structure is a wing, the lifting surface may comprise an inner (root) part of the wing and the control device may comprise a winglet, or any other control device that can be movably attached to a wing, at or near the tip. In some examples the aerodynamic structure may be (at least part of) a vertical stabilizer, or (at least part of) a horizontal stabilizer (tailplane).

The following examples relate to wing tip devices attached to the tip of a wing, but other examples are envisaged in which the control device is attached to an aerodynamic structure near, but not necessarily at, a tip of that structure. Such devices may be, for example, outboard flaps, outboard spoilers, ailerons or the like. For the purposes of the present invention, an attachment location "near" the tip may be any attachment location closer to the tip than to the root. In some examples, a control device attached near the tip may be attached to a location comprised in the outer half of the aerodynamic structure (with "outer" and "inner" being defined with respect to the spanwise axis of the aerodynamic structure, such that the tip comprises the outermost point and the root comprises the innermost point of the structure). In some examples, a control device attached near the tip may be attached to a location comprised in the outer third of the aerodynamic structure. An attachment location near the tip may be comprised in the outer 30% of the aerodynamic structure. In general, an attachment location near the tip is one which permits a path through the wing from the attachment location to a location at or near the root of the wing to experience a non-negligible length change in response to the level of wing deformation typically experienced during operation of that wing.

In the particular example of FIG. 1, the lifting surface 11 is arranged as a wing of a fixed wing aircraft, in particular a cranked, aft swept transonic wing, e.g. for a civil airliner, and the control device 12 is a wing tip device. It will be appreciated that the lifting surface 11 may take a variety of different planform shapes and profiles depending on the particular application. In particular, the lifting surface 11 may have a straight trailing edge, may be un-swept or swept forwards (leading edge sweep or quarter chord sweep), and/or may have a curved leading and/or trailing edge. The lifting surface 11 has a root 111 at the inboard end of the lifting surface 11 and a tip 112 at the outboard end of the lifting surface 11. The flexural axis (elastic axis) of the lifting surface 11 is indicated by dashed line X, and extends in the spanwise direction of the lifting surface 11. The lifting surface 11 is deformable by twisting about the flexural axis X.

The functional effect of the control device 12 may be to control the loading experienced by the lifting surface 11 during operation of the aerodynamic structure 1. In particular, the control device 12 may be configured such that a value of torque and/or force effective at the lifting surface 11 about the flexural axis X is variable in dependence on the relative positions of the control device 12 and the lifting surface 11.

The illustrated control device 12 comprises a first tip device 12a movably attached to the tip 112 and a second tip device 12b movably attached to the tip 112. Each tip device has a lifting surface which is movable relative to the lifting surface 11. The first tip device 12a is swept forwards and the second tip device 12b is swept backwards. The first tip device 12a has a leading edge which is swept forward with respect to the aft sweep of the leading edge of the lifting surface 11. The first tip device 12a leading edge is also swept forward with respect to the spanwise direction (i.e. perpendicular to the chord) at the tip 112. The second tip device 12b has a leading edge swept aft with respect to the leading edge sweep of the lifting surface 11 and also swept aft with respect to the spanwise direction. In other embodiments it may be desirable that the first tip device 12a is swept forward with respect to the leading edge sweep of the lifting surface 11 but is either un-swept or swept aft with respect to the spanwise direction. Also, it may be desirable that the second tip device 12b is swept aft with respect to the spanwise direction but is either un-swept or swept forward with respect to the leading edge of the lifting surface 11.

The first tip device 12a is mounted for rotation about axis 13a. Similarly, the second tip device 12b is mounted for rotation about axis 13b. In the illustrated example the axes 13a and 13b extend substantially perpendicular to the chordwise direction at the tip 112. However, the rotational axis of a tip device may extend in any direction which causes rotation of the tip device to alter the angle of incidence of the tip device. In the illustrated example movement of the first tip device 12a is mechanically independent of movement of the second tip device 12b. However; this need not be the case. For example, in some simplified versions of the device the actuation mechanism 14 may comprise a single actuation mechanism arranged to control both of the first and second tip devices 12a, 12b.

The particular control device 12 is intended to represent an illustrative example, and it should be appreciated that example aerodynamic structures according to the invention may comprise any type of movable control device. In some examples the control device 12 may not comprise first and second tip devices 12a, 12b, but may instead comprise a unitary tip device, such that the control device 12 has a single lifting surface. GB 2533413 describes various movable tip devices for controlling wing loading. Any of the tip devices described in GB 2533413 may be comprised in an aerodynamic structure according to the present invention.

The actuation mechanism 14 is configured to transmit deformation movement of the lifting surface 11 to the control device 12. The lifting surface 11 is deformable between a first deformed state (which may correspond, for example, to deformation in a first direction), an undeformed or "neutral" state, and a second deformed state (which may correspond, for example, to deformation in a second direction different to the first direction). For example, in the first deformed state the lifting surface 11 may be twisted about the flexural axis X in a first direction, and in the second deformed state the lifting surface 11 may be twisted about the flexural axis X in a second, opposite, direction.

In such examples the control device 12 is configured such that in a first deployed position it generates torque and/or force effective at the lifting surface 11 about the flexural axis X in the second direction, and in a second deployed position it generates torque and/or force effective at the lifting surface 11 about the flexural axis X in the first direction. The control device 12 can thereby counteract twisting of the lifting surface 11 caused by aerodynamic loading experienced by the lifting surface 11 during flight. In particular, by changing the torque/moment effective at the lifting surface 11 about the flexural axis X during flight it becomes possible to control the wing twist and hence the aerodynamic loading distribution across the lifting surface 11 in the spanwise direction. The amount of torque/moment generated by the control device 12 is controlled by the actuation mechanism 14, e.g. to optimise the twist distribution of the lifting surface 11 according to operating and environmental conditions. Moreover; since the actuation mechanism 14 is configured to directly convert deformation movement of the lifting surface 11 into movement of the control device 12, the control device 12 automatically moves to provide an improved lift distribution when such deformation occurs.

A deployed position of the control device 12 is intended to mean any position of the control device 12 other than a predefined non-deployed (neutral) position. In examples in which the control device 12 is configured to control the aerodynamic loading distribution experienced by the lifting surface 11 by generating torque and/or force effective at the lifting surface about the flexural axis, the non-deployed position may be defined such that the control device 12 does not generate any torque/force about the flexural axis X when in the non-deployed position. In some examples the actuation mechanism 14 is configured such that the control device 12 is in a first deployed position when the lifting surface 11 is in the first deformed state, is in a non-deployed position when the lifting surface 11 is in the undeformed state, and is in a second deployed position when the lifting surface 11 is in the second deformed state. The position of the control device 12 may be correlated with the deformation state of the lifting surface 11, according to a predefined relationship linked to the nature of the actuation mechanism 14.

The actuation mechanism 14 may take various forms, and in essence may comprise any mechanism able to transmit deformation movement of the lifting surface 11 to the control device 12, so as to cause corresponding movement of the control device 12. The actuation mechanism 14 physically connects at least one selected location 141 on the lifting surface 11 (which may, for example, be a location which experiences significant movement and/or stress due to deformation of the lifting surface 11) to the control device 12. The actuation mechanism may comprise, for example, one or more of: a cable, a linkage, a rod, a gear train, a hinge, a pulley, or the like.

Figure 2:
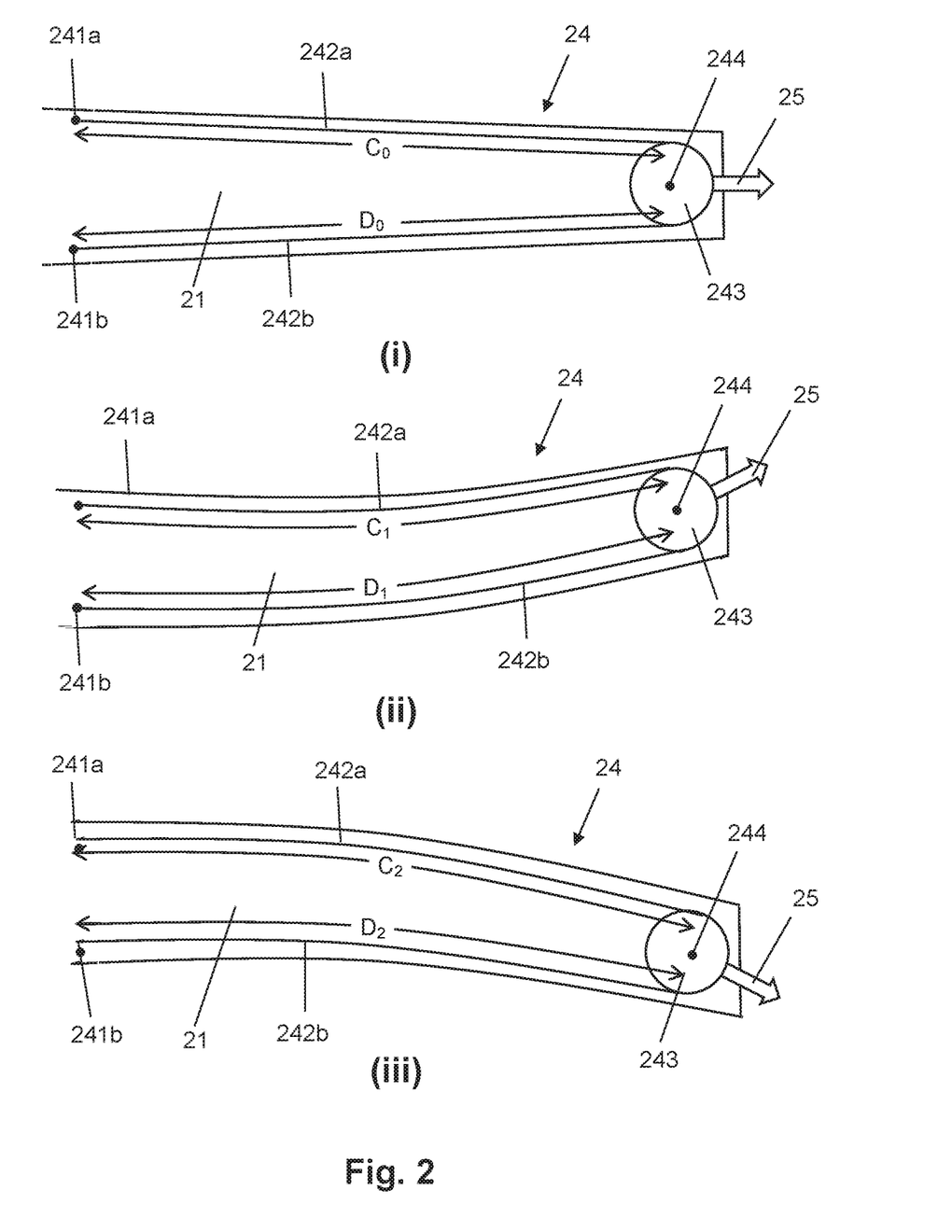
FIG. 2 shows spanwise cross-sections through an example lifting surface of an example aerodynamic structure according to the invention, in three different deformation states.

FIG. 2 illustrates a particular example actuation mechanism 24 suitable for use with the aerodynamic structure 1 of FIG. 1. Parts (i), (ii) and (iii) of FIG. 2 show spanwise cross-sections through an example lifting surface 21, respectively in an undeformed state, a first deformed state, and a second deformed state. The lifting surface 21 may have the same features as the lifting surface 11 described above. The actuation mechanism 24 transmits deformation movement of the lifting surface 21 to a control device mounted to the control of the lifting surface 21. For the sake of clarity, the control device is not shown in FIG. 2.

The actuation mechanism 24 comprises a first connecting component 242a having a first end attached to a first attachment location 241a on the lifting surface 21 and a second end connected to the control device, and a second connecting component 242b having a first end attached to a second attachment location 241b on the lifting surface 21 and a second end connected to the control device. In the particular example of FIG. 2, each of the first and second connecting components 242a, 242b is connected to the control device via a control wheel 243, however other examples are envisaged in which one or both of the first and second connecting components 242a, 242b is directly attached to the control device.

Although the illustrated actuation mechanism 24 comprises two connecting components of a similar structure and function, other examples are envisaged in which the actuation mechanism 24 comprises a single connecting component. Such a single connecting component may have any or all of the same features as the first and second connecting components 242a, 242b described herein. In some examples a single connecting component may advantageously be rigid, such that it can exert both a pulling and a pushing force. Moreover; in examples having two (or more) connecting components, the structure and function of the connecting components need not be similar. For example, a first connecting component may be of the type described herein, configured to transmit a deformation movement to a control device, whilst a second connecting component may comprise a biasing mechanism (such as a spring or other elastic member connecting the control device to a location on the lifting surface) configured to return the control device to a neutral position.

The connection of the control wheel 243 to the control device is represented by the block arrow 25, and may comprise any suitable mechanical connection able to convert rotary motion of the control wheel 243 into movement of the control device. It should be appreciated that the control wheel need not be circular, and that the term "wheel" is intended to cover any rotating control device. Moreover, other examples are envisaged in which the control wheel 243 is replaced by an alternative control part, such as a control lever or a control gear.

Each of the first connecting component 242a and the second connecting component 242b has a fixed length (that is, the connecting components 242a, 242b are non-extensible). The first and second attachment locations 241a, 241b are located such that a distance between at least one of the attachment locations 241a, 241b and the control of the lifting surface 21 is variable in dependence on a deformation state of the lifting surface 21. The first attachment location 241a is located such that a distance between the first attachment location 241a and the control device 12 varies with the deformation state of the lifting surface 21 according to a first predefined relationship and the second attachment location 241b is located such that a distance between the second attachment location 241b and the control device 12 varies with the deformation state of the lifting surface 21 according to a second predefined relationship. For example, the first predefined relationship may be defined based on a first route through the aerodynamic structure followed by the first connecting component 242a and the second predefined relationship may be defined based on a second route through the aerodynamic structure followed by the second connecting component 242b. The relevant distance between an attachment location and the control device 12 may therefore, in some examples, not be the straight-line distance between that attachment location and the control device 12.

The attachment locations 241a, 241b may be selected based on how they move due to deformation of the lifting surface 21. For example, a given location may be selected to be the first attachment location 241a or the second attachment location 241b based on the amount of movement, and/or the direction of movement of that location in response to a particular amount and/or type of deformation of the lifting surface 241. Alternatively or additionally, a given location may be selected to be the first or second attachment location based on the amount by which the distance between that location and the control device changes in response to a particular amount and/or type of deformation of the lifting surface 241. For example a distance change of more than a threshold amount, in response to a particular degree of deformation, may be desired to facilitate the functioning of a particular actuation mechanism. The second attachment location 241b may be selected based on the first attachment location 241a. For example, the second attachment location 241b may be on a part of the lifting surface 21 which experiences deformation in a different direction to the part of the lifting surface 21 comprising the first attachment location 241a. The first and second attachment locations 241a, 241b may be selected such that the distance between the first attachment location 241a and the control device 12 shortens for a given type of deformation, whilst the distance between the second attachment location 241b and the control device 12 lengthens for that type of deformation, or vice versa. Either or both of the first attachment location 141a and the second attachment location 141b may be one or more of: at or near a leading edge of the lifting surface, at or near a trailing edge of the lifting surface; at or near a mid-chord location of the lifting surface; at or near the root; at or near an external skin of the lifting surface. In FIG. 2, the first attachment location 241a is adjacent an upper external skin of the lifting surface 21 and the second attachment location 241b is adjacent a lower external skin of the lifting surface 21. In the illustrated example the first and second attachment locations 241a, 241b are at substantially the same distance from the control device 12 in the undeformed state of the lifting surface, but this need not be the case in other examples.

In the particular example of FIG. 2, the first connecting component 242a comprises a flexible wire routed along a first particular path through the structure of the lifting surface 21 between the first attachment location 241a and a first circumferential point on the control wheel 243. The relevant distance between the first attachment location 241a and the control device 12 is therefore the length of the path between the first attachment location 241a and the first circumferential point along which the first connecting component 242a is routed. Similarly, the second connecting component 242b comprises a flexible wire routed along a second particular path through the structure of the lifting surface 21 between the second attachment location 241b and a second circumferential point on the control wheel 243. The relevant distance between the second attachment location 241b and the control device 12 is therefore the length of the path between the second attachment location 241b and the second circumferential point along which the second connecting component 242b is routed.

In the undeformed state shown in (i), the length $C_0$ of the path between the first attachment location 241a and the first circumferential location is greater than the length $C_1$ of the path between the first attachment location 241a and the first circumferential location when the lifting surface is in the first deformed state shown in (ii), and is smaller than the length $C_2$ of the path between the first attachment location 241a and the first circumferential location when the lifting surface is in the second deformed state shown in (iii). In the undeformed state the length $D_0$ of the path between the second attachment location 241b and the second circumferential location is smaller than the length $C_1$ of the path between the second attachment location 241b and the second circumferential location when the lifting surface is in the first deformed state and is greater than the length $C_2$ of the path between the second attachment location 241b and the second circumferential location when the lifting surface is in the second deformed state. Since the connecting components 242a, 242b are non-extensible, an increase in the path length between an attachment location and a corresponding circumferential location on the control wheel 243 causes the connecting component attached to those locations to exert a pulling force on the control wheel 243. Depending on the nature of the connecting component (e.g. whether or not it is flexible); a decrease in the distance between an attachment location and the control device 12 may cause the associated connecting component to exert a pushing force.

In the arrangement of FIG. 2, the pulling force exerted by a connecting component 242a, 242b as a result of an increase in the distance between the attachment location of that connecting component and the control device 12 is exerted on the circumference of the control wheel 243. The first and second connecting components 242a, 242b are each attached to a circumferential point on the control wheel 243 in a suitable manner to be able to exert a pulling force on the control wheel 243. In some examples the first and second connecting components 242a and 242b are separate wires, each attached to a different circumferential point on the control wheel 243. In other examples the first and second connecting components 242a, 242b comprise opposite ends of a single wire, which passes around the control wheel and contacts a circumferential portion of the control wheel 243. In such examples the contact between the wire and the control wheel 243 is configured to prevent relative movement of the wire and the control wheel, at least under the pulling forces expected to be exerted by the first and second connecting components 242a, 242b during flight.

The control wheel 243 is rotatably mounted to the tip of the lifting surface 21, and is rotatable about a rotation axis 244. A pulling force exerted by the first connecting component 242a causes the control wheel 243 to rotate in an anti-clockwise direction, and a pulling force exerted by the second connecting component 242b causes the control wheel 243 to rotate in a clockwise direction. The control wheel 243 is connected to the control device in a manner such that rotation of the control wheel 243 causes movement of the control device. The connection between the control wheel 243 and the control device may comprise any suitable mechanical connection able to convert rotational movement of the control wheel 243 into movement of the control device. In some examples the control device is configured to rotate about an axis which is at an angle to the axis of rotation 244 of the control wheel 243, and the control wheel 243 is connected to the control device by a transmission mechanism configured to convert rotation about the axis of rotation 244 of the control wheel 243 into rotation about the axis of rotation of the control device.

In some examples the lifting surface 21 may be connected to multiple control devices (such as the example of FIG. 1). In some such examples, the actuation mechanism controls the movement of all of the multiple control devices, and is configured to transmit deformation movement of the lifting surface 21 to each of the multiple control devices. In particular, the control wheel 243 is connected to each of the multiple control devices such that rotation of the control wheel 243 causes movement of each of the multiple control devices. In such arrangements the control devices move in tandem, and cannot be controlled to move independently. In other examples comprising multiple control devices, one or more additional actuation mechanisms are provided. Each actuation mechanism may be connected to a different control device, or a different group of control devices. Each actuation mechanism may be attached to different attachment locations, or one or more of the actuation mechanisms may be connected to the same attachment locations. The additional actuation mechanism(s) may have the same features as the actuation mechanism 24 described above.

Figure 3:
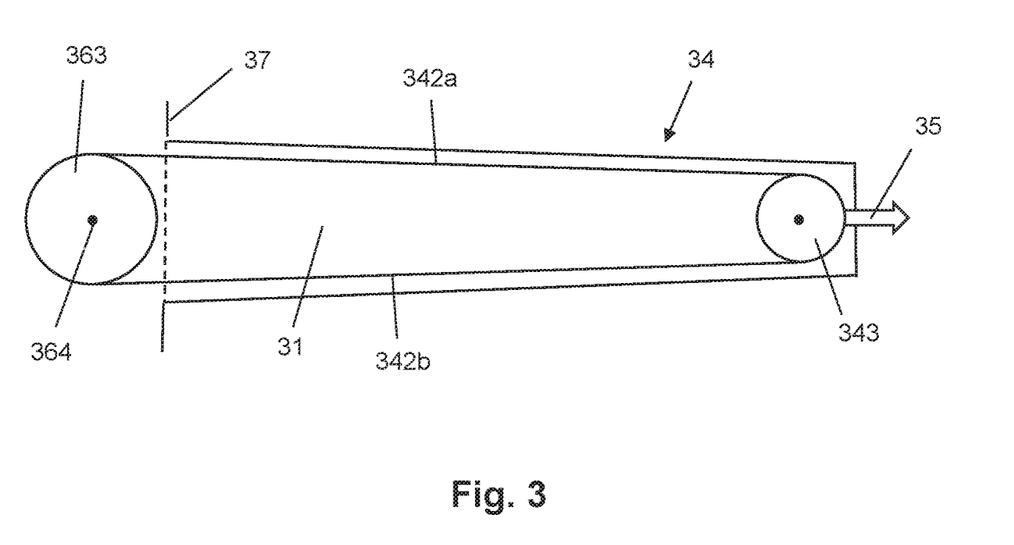
FIG. 3 shows a spanwise cross-section through an example lifting surface of a further example aerodynamic structure according to the invention.

FIG. 3 shows another particular example actuation mechanism 34 suitable for use with the aerodynamic structure 1 of FIG. 1. FIG. 3 shows a spanwise cross-section through an example lifting surface 31 in an undeformed state. The lifting surface 31 may have the same features as the lifting surface 11 described above. The actuation mechanism 34 transmits deformation movement of the lifting surface 31 to a control device (not shown) mounted to the tip of the lifting surface 31, and additionally is configured to cause movement of the control device based on a control input. The control input may be, e.g., a manual input from flight crew, an automatic input from an autopilot system, or the like.

The actuation mechanism 34 comprises a first connecting component 342a, a second connecting component 342b, a control device control wheel 344 and a connection 35 to a control device, which may have any or all of the features of the corresponding components 242a, 242b, 244 and 25 described above in relation to FIG. 2. The actuation mechanism 34 further comprises a root-end control wheel 363 rotatably mounted to the fuselage of an aircraft of which the lifting surface 31 forms a part. The outer edge of the fuselage is indicated by the reference number 37 in FIG. 3. The lifting surface 31 is not shown in proportion; for the sake of clarity (typically it will have a greater span compared to its thickness). The root-end control wheel 363 is rotatable about a rotation axis 364. The control wheel 243 is arranged to receive the control input in any suitable manner. For example, the root-end control wheel 363 may be connected to an actuator arranged to cause rotation of the root-end control wheel 363, and such an actuator may be controllable manually by flight crew, and/or electronically by an autopilot system.

The first attachment location of the first connecting component 342a is a first circumferential point on the root-end control wheel 363. Similarly, the second attachment location of the second connecting component 242b is a second circumferential point on the root-end control wheel 363. The relevant distance between the first attachment location and the control device is therefore the length of the path between the first circumferential point on the root-end control wheel 363 and the first circumferential point on the control device control wheel 343 along which the second connecting component 242b is routed, and the relevant distance between the second attachment location 241b and the control device is therefore the length of the path between the second circumferential point on the root-end control wheel 363 and the second circumferential point on the control device control wheel 343 along which the second connecting component 242b is routed. The first and second circumferential points on the root-end control wheel are spaced apart from each other, such that for any given rotational position of the root-end control wheel 363, the paths through the structure of the lifting surface 21 taken by the first and second connecting components 242a, 242b will change length differently in response to a deformation of the lifting surface. The attachment of the root-ends of the first and second connecting components 342a, 342b to the root-end control wheel 363 may be effected in the same manner as the attachment to the tip-ends of the connecting components to the control device control wheel 343 (which may be as described above in relation to FIG. 2).

The root-end control wheel 363 may be fixed in a selected rotational position, using any suitable locking mechanism. When the root-end control wheel 363 is fixed in a neutral position, the first and second circumferential locations on the root-end control wheel will move relative to the control device due to deformations of the lifting surface 31, and the actuation mechanism 34 will function in the same manner as the actuation mechanism 24 of FIG. 2. However; the root-end control wheel 363 also enables manual control of the control device movement because rotating the root-end control wheel will change the distances between the first and second circumferential locations on the root-end control wheel 363, and will therefore cause at least one of the first and/or second connecting components 342a, 342b to pull or push on the control device control wheel 343. This functionality can be used as the primary means of controlling the control device, or it can be used in conjunction with automatic control based on the transmission of deformation movement. For example, the rotational position of the root-end control wheel can be set to a desired position away from the neutral position, to alter how the control device reacts to a given deformation.

Returning to FIG. 1, the aerodynamic structure 1 may further comprise at least one sensor (not illustrated) to detect a deformation state of the lifting surface 11. The at least one sensor may comprise, for example, one or more of: an accelerometer, a positioning sensor, a velocity sensor, a stress sensor, a strain sensor, or the like. The at least one sensor is configured to acquire data relating to a current shape of the lifting surface 11, from which a current deformation state of the lifting surface 11 can be determined. In some examples the aerodynamic structure comprises a plurality of sensors, positioned at different locations on the lifting surface. Such sensors provide a way to monitor the deformation state of the lifting surface 11.

In some examples, movement of the control device 12 may be controllable based on data acquired by the sensors, for example by an electrically controlled actuator which is provided alongside the mechanical actuation mechanism 14. In such examples the mechanical actuation mechanism 14 may be disconnectable from the control device 12, to enable control to be passed to the electronic actuator.

In some examples in which the aerodynamic structure 1 comprises at least one sensor as described above, the at least one sensor is communicatively coupled to an avionics system of an aircraft on which the aerodynamic structure 1 is installed. The at least one sensor is configured to send data indicating a deformation state of the lifting surface 11 to the avionics system. Such data may be useful, for example, in aiding a pilot with operating the aircraft, or for later use by ground crew to analyse the stresses experienced by the lifting surface 11 over the course of its operational history.

In some examples in which the aerodynamic structure 1 comprises at least one sensor as described above, the aerodynamic structure 1 further comprises a locking mechanism (not illustrated) to prevent movement of the control device 12. The locking mechanism may be configured to activate in response to a detection by the at least one sensor of a deformation state meeting a predefined locking criterion. For example, a predefined locking criterion may comprise a threshold amount of deformation, and may be defined such that a deformation state exceeding the threshold meets the predefined locking criterion. The locking mechanism can thereby prevent the control device 12 from moving more than intended and potentially becoming damaged, if unusually large deformations of the lifting surface 11 are experienced. In some examples the locking mechanism may be additionally or alternatively configured to activate in response to the failure of one or more of the components of the actuation mechanism 14 (e.g. breaking or disconnection of a connection member). Such a failure may be detected in any suitable manner. In some examples the aerodynamic structure 1 may comprise a locking mechanism but not any sensors for detecting deformation of the lifting surface 11, in which case the locking mechanism may be configured to activate in response to the failure of one or more of the components of the actuation mechanism 14.

Figure 4:
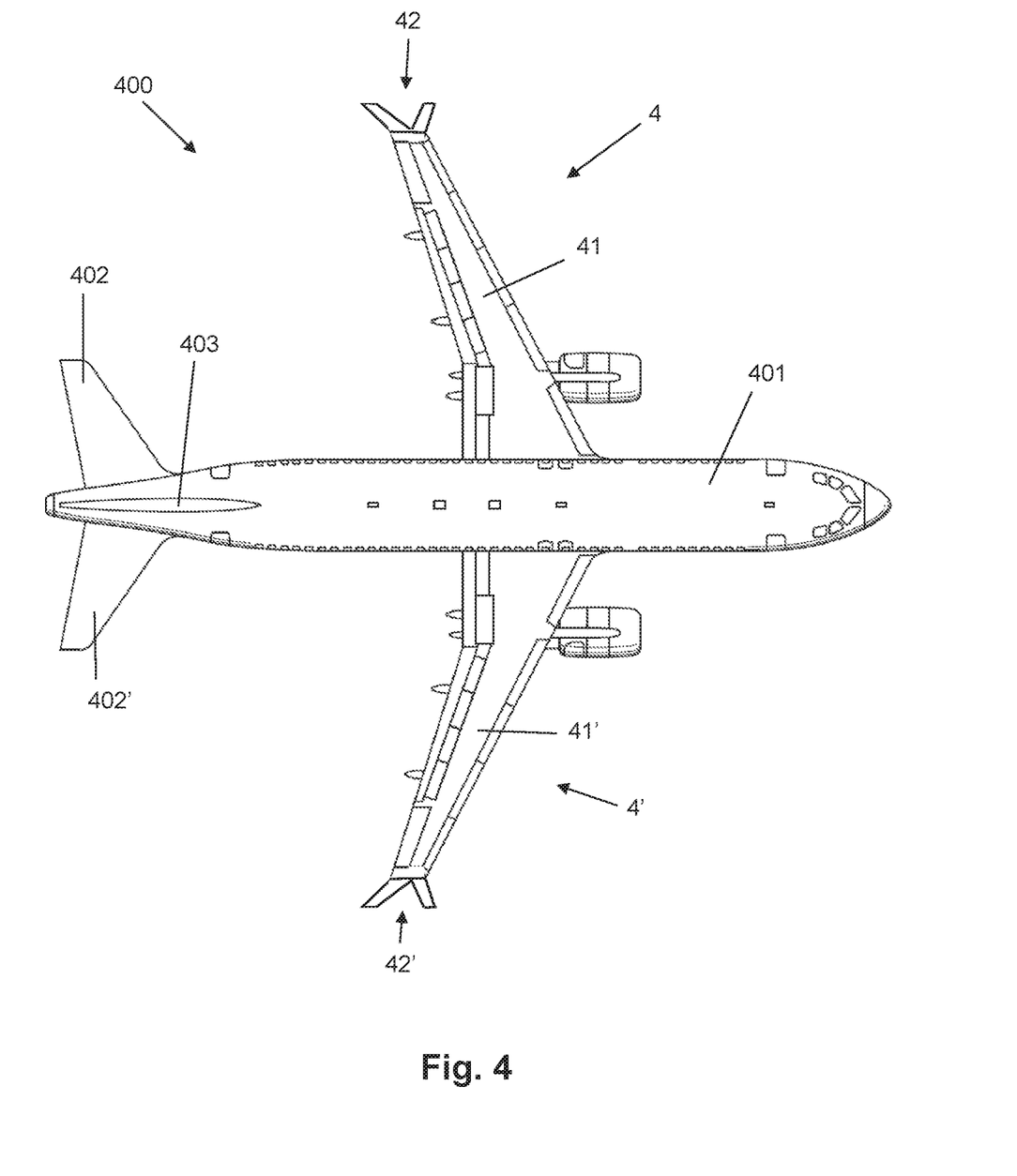
FIG. 4 is a plan view of an example aircraft comprising an example aerodynamic structure according to the invention.

FIG. 4 is a plan view of an aircraft 400 comprising an aerodynamic structure according to the invention. In particular the aircraft 400 comprises an aerodynamic structure in the form of an aircraft wing 4, comprising a lifting surface 41 having a root and a tip. The root is attached to the fuselage 401 of the aircraft. A control device 42 is movably connected to the wing 4 (in this example, to the tip). The wing 4 may be an aerodynamic structure having the features of the example aerodynamic structure 1 described above. The aircraft 400 comprises a further aerodynamic structure according to the invention, in the form of a second wing 41'. The second wing 41' may have corresponding features to the first wing 41, including a lifting surface 41' and a control device 42'. The aircraft 400 comprises further aerodynamic structures in the form of a vertical stabiliser 403, and a pair of tailplanes 402, 402'. Any or all of these further aerodynamic structures may be aerodynamic structures according to the invention.

The examples described above relate to wings of fixed civil airliners, but the invention has broad application to a variety of flexible lifting surfaces, including rotary wings (helicopter blades, where a control device could assist the manoeuvrability and control of the rotor), wind turbines, compressor blades, propellers, gliders, etc.

Although the invention has been described above with reference to one or more preferred examples or embodiments, it will be appreciated that various changes or modifications may be made without departing from the scope of the invention as defined in the appended claims.

Where the term "or" has been used in the preceding description, this term should be understood to mean "and/or", except where explicitly stated otherwise.

The invention claimed is:

1. An aerodynamic structure, comprising:
   a lifting surface having a root and a tip, the lifting surface being deformable during operation of the aerodynamic structure;
   a control device movably attached to the lifting surface at or near the tip; and
   an actuation mechanism for controlling movement of the control device, wherein the actuation mechanism is configured to transmit deformation movement of the lifting surface to the control device;
   wherein the actuation mechanism comprises at least one connecting component having a first end attached to an attachment location on the lifting surface and a second end connected to the control device; and,
   wherein the at least one connecting component has a fixed length, and wherein the attachment location is located such that a distance between the attachment location and the control device is variable in dependence on a deformation state of the lifting surface.

2. An aerodynamic structure according to claim 1, wherein the lifting surface is deformable by twisting about a flexural axis extending in the spanwise direction of the lifting surface, and wherein a value of torque or force effective at the lifting surface about the flexural axis is variable in dependence on the relative positions of the control device and the lifting surface.

3. An aerodynamic structure according to claim 1, wherein the lifting surface is deformable between a first deformed state, an undeformed state, and a second deformed state, and wherein the actuation mechanism is configured such that the control device is in a first deployed position when the lifting surface is in the first deformed state, is in a non-deployed position when the lifting surface is in the undeformed state, and is in a second deployed position when the lifting surface is in the second deformed state.

4. An aerodynamic structure according to claim 3, wherein the lifting surface is deformable by twisting about a flexural axis extending in the spanwise direction of the lifting surface, wherein a value of torque or force effective at the lifting surface about the flexural axis is variable in dependence on the relative positions of the control device and the lifting surface, and wherein in the first deformed state the lifting surface is twisted about the flexural axis in a first direction, and in the second deformed state the lifting surface is twisted about the flexural axis in a second, opposite, direction, and wherein the control device is configured such that in the first deployed position it generates torque and/or force effective at the lifting surface about the flexural axis in the second direction, and in the second deployed position it generates torque and/or force effective at the lifting surface about the flexural axis in the first direction.

5. An aerodynamic structure according to claim 1, wherein the attachment location is one or more of:
   at or near a leading edge of the lifting surface;
   at or near a trailing edge of the lifting surface;
   at or near a mid-chord location of the lifting surface;
   at or near the root;
   at or near an external skin of the lifting surface.

6. An aerodynamic structure according to claim 1, wherein the actuation mechanism comprises:
   a first connecting component having a first end attached to a first attachment location on the lifting surface and a second end connected to the control device; and
   a second connecting component having a first end attached to a second attachment location on the lifting surface and a second end connected to the control device.

7. An aerodynamic structure according to claim 6, wherein the first attachment location is located such that a distance x between the first attachment location and the control device varies with the deformation state of the lifting surface according to a first predefined relationship and the second attachment location is located such that a distance y between the second attachment location and the control device varies with the deformation state of the lifting surface according to a second predefined relationship.

8. An aerodynamic structure according to claim 7, wherein the first predefined relationship is defined based on a first route through the aerodynamic structure followed by the first connecting component and the second predefined relationship is defined based on a second route through the aerodynamic structure followed by the second connecting component.

9. An aerodynamic structure according to claim 7, wherein the first attachment location is at or near an upper external skin of the lifting surface and the second attachment location is at or near a lower external skin of the lifting surface.

10. An aerodynamic structure according to claim 1, wherein the actuation mechanism comprises a control wheel rotatably mounted to the lifting surface and connected to the control device such that rotation of the control wheel causes movement of the control device, and wherein the connection of each connecting component to the control device comprises attachment of the second end of each connecting component to the control wheel.

11. An aerodynamic structure according to claim 10, wherein the control device is configured to rotate about an axis which is at an angle to the axis of rotation of the control wheel, and wherein the control wheel is connected to the control device by a transmission mechanism configured to convert rotation about the axis of rotation of the control wheel into rotation about the axis of rotation of the control device.

12. An aerodynamic structure according to claim 1, further comprising an additional control device movably attached to the lifting surface at or near the tip.

13. An aerodynamic structure according to claim 12, wherein the actuation mechanism is additionally for controlling movement of the additional control device, and is configured to transmit deformation movement of the lifting surface to the control device and to the additional control device.

14. An aerodynamic structure according to claim 13, further comprising an additional actuation mechanism for controlling movement of the additional control device independently to movement of the control device.

15. An aerodynamic structure according to claim 1, further comprising at least one sensor to detect a deformation state of the lifting surface and a locking mechanism to prevent movement of the control device, wherein the locking mechanism is configured to activate in response to a detection by the at least one sensor of a deformation state meeting a predefined locking criterion, and/or in response to a failure of one or more components of the actuation mechanism.

16. An aerodynamic structure according to claim 15, wherein the at least one sensor is communicatively coupled to an avionics system of an aircraft on which the aerodynamic structure is installed, and wherein the at least one sensor is configured to send data indicating a deformation state of the lifting surface to the avionics system.

17. An aerodynamic structure according to claim 1, wherein the control device is a tip device, and is attached to the tip of the lifting surface.

18. A wing for an aircraft, comprising:
   a main part and a control part movable relative to the main part,
   wherein at least the main part is configured to deform during operation of the aircraft, and wherein the position of the control part is controlled in dependence on the deformation of the main part by an actuation mechanism comprising at least one connecting component having a first end attached to an attachment location on the main part and a second end connected to the control part,
   wherein the at least one connecting component has a fixed length, and wherein the attachment location is located such that a distance between the attachment location and the control part is variable in dependence on a deformation state of the main part, and
   wherein the actuation mechanism is configured to cause movement of the control part by transmitting motion of a location on the main part to the control part.

* * * * *